(12) United States Patent  
Peterson

(10) Patent No.: US 6,708,181 B1
(45) Date of Patent: Mar. 16, 2004

(54) SYSTEM AND METHOD FOR INITIALIZING VARIABLES IN AN OBJECT-ORIENTED PROGRAM

(75) Inventor: James Lyle Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 09/145,102

(22) Filed: Sep. 1, 1998

(51) Int. Cl.[7] .............................................. G06F 17/30
(52) U.S. Cl. ...................................................... 707/103
(58) Field of Search ................................ 707/103, 101; 709/303, 207

(56) References Cited

U.S. PATENT DOCUMENTS

| | | | | |
|---|---|---|---|---|
| 5,361,350 A | * | 11/1994 | Conner et al. ............... | 707/103 |
| 5,590,327 A | | 12/1996 | Biliris et al. ................ | 709/100 |
| 5,644,770 A | | 7/1997 | Burke et al. ................. | 717/10 |
| 5,692,195 A | | 11/1997 | Conner et al. ............... | 709/316 |
| 5,694,597 A | | 12/1997 | Cantin et al. ................ | 707/103 |
| 5,729,739 A | | 3/1998 | Cantin et al. ................ | 707/103 |
| 5,787,431 A | * | 7/1998 | Shaughnessy ................ | 707/101 |
| 5,966,702 A | * | 10/1999 | Fresko et al. ................. | 707/1 |
| 5,995,753 A | * | 11/1999 | Walker ......................... | 712/12 |
| 6,003,038 A | * | 12/1999 | Chen ............................ | 707/103 |

* cited by examiner

*Primary Examiner*—Greta Robinson
(74) *Attorney, Agent, or Firm*—Kelly K. Kordzik; Winstead Sechrest & Minick P.C.; Jeffrey S. LaBaw

(57) ABSTRACT

A method for initializing variables within class objects in a statically loaded object-oriented programming language. A two-phase flooding algorithm is utilized to initialize the core variables within each class along with those variables needed to be initialized before the core variables. An initialization algorithm is performed within each of the class objects in a recursive manner. Once a class object has begun the initialization process internally, calls to again begin the initialization process within that class object from another class object will result in a return in order to prevent duplicates of the initialization process from being performed within each of the class objects.

17 Claims, 4 Drawing Sheets

SYSTEM AND METHOD FOR INITIALIZING VARIABLES IN AN OBJECT-ORIENTED PROGRAM

TECHNICAL FIELD

The present invention relates in general to data processing systems, and in particular, to a method for initializing variables within classes in an object-oriented programming environment.

BACKGROUND INFORMATION

Object-oriented programming implements programming techniques in an attempt to model real-world objects. An object is a software "package" that contains a collection of related procedures and data. Such procedures are called methods, and the data elements are referred to as variables. Objects interact with each other by sending each other messages requesting that they carry out their methods. A message is simply the name of an object followed by the name of a method the object knows how to execute. Therefore, object-oriented programming consists of a number of objects interacting with each other by sending messages to one another.

A class is a template that defines the methods and variables to be included in a particular type of object. The descriptions of the methods and variables that support them are included only once, in the definition of the class. The objects that belong to a class, called instances of the class, contain only their particular values for the variables. FIG. 1 illustrates a class 100 having methods 101–105 and N variables.

Therefore, in an object-oriented programming system, objects are grouped into classes. The classes define the fields and methods that can be applied to an object. Object classes are organized into an inheritance hierarchy which defines how some object classes can inherit fields and methods and extend them with additional fields and methods. In addition to the inheritance hierarchy, classes and methods may use other classes and methods in their implementation.

Classes and objects may have fields which need to be initialized to the proper initial values. Object instance fields are initialized when an object is created. Class fields must be initialized before any object of the class is created or used. Classes must be initialized in a correct order. Many orders may be possible, but there are a set of constraints defined by the definition of the class which can be determined either by the programmer or at compile time.

Some languages, such as JAVA, dynamically load classes when they are first referenced and initialize the class when the class is dynamically loaded. For example, when the JAVA program gets loaded into memory, it is at that point that the variables are initialized. Some of the variables within a class may be already determined, but there may be some variables that are defined by some function, such as the square root of 2, which are performed by methods within other classes. To determine that variable, there is a call to that method (square root of 2 function) within another class object. The JAVA program will then have to load that class object into memory, and initialize its core variables.

In JAVA this is fairly straight forward because of the dynamic loading of the JAVA program. Other languages, such as C++, statically load classes and provide little to control the order of class initialization.

In a C++ program, the above method would require that all of the classes be loaded at the same time. One of the problems is that the order for initialization within C++ is not defined. A programmer can attempt to define a set of priorities for ordering the initializations, but if a circularity is encountered, there can be a difficulty in dealing with such a situation.

SUMMARY OF THE INVENTION

The present invention addresses the foregoing problems by defining a variable for each class indicating whether the initialization of the core values in that class have completed or are in progress, and by also incorporating an "importance level" parameter to each class initialization method. The importance level parameter ensures that each class initialization method initializes its BEFORE classes first, and then initializes the AFTER classes at a later time (BEFORE and AFTER are defined hereinafter). This allows the process to first initialize all important classes (where the definition of what is important is determined locally by the class and the situation), but still ensures that all reachable classes are initialized eventually before beginning the main method.

In one embodiment of the present invention a program method is implemented for initializing variables in each of a plurality of class objects created in a statically loaded object-oriented programming language. Within each of the class objects, messages are sent to BEFORE class objects to initialize their core variables. Also, within each of the class objects, initializing of the core variables is performed after all of the BEFORE class objects have initialized their core variables. BEFORE class objects are those class objects listed whose core variables need to be initialized before the core variables of the present class object. Within each of the class objects after the core variables have been initialized, AFTER classes may be initialized.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
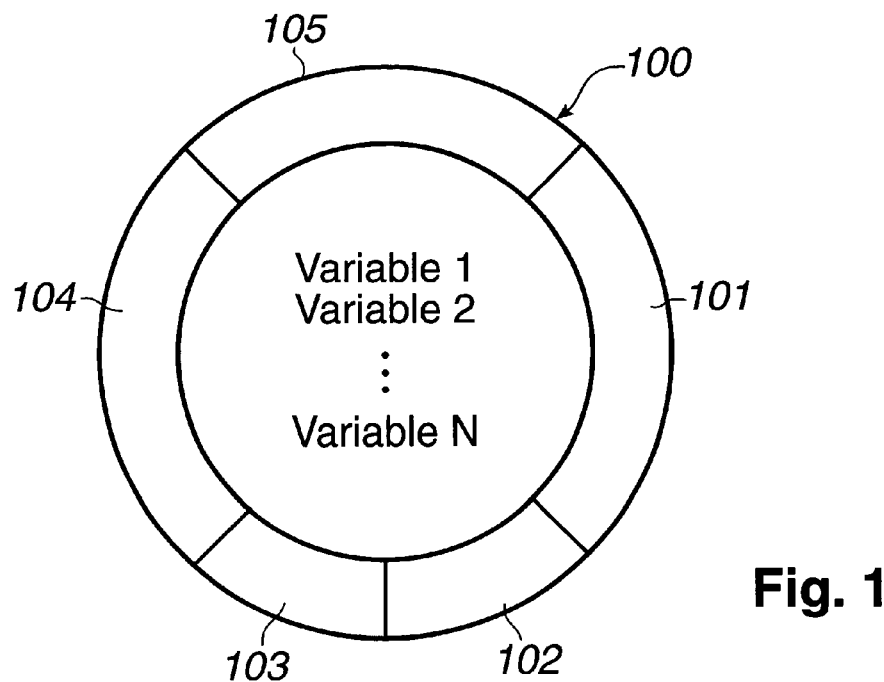
FIG. 1 illustrates a class.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention is applicable to any object-oriented programming method, but is specifically described herein with respect to a statically loaded object-oriented program language, such as C++. The object-oriented program to be initialized in accordance with the present invention; and the algorithm described herein with respect to the present invention may be implemented within any data processing system, such as the computer system described with respect to FIG. 4.

Figure 4:
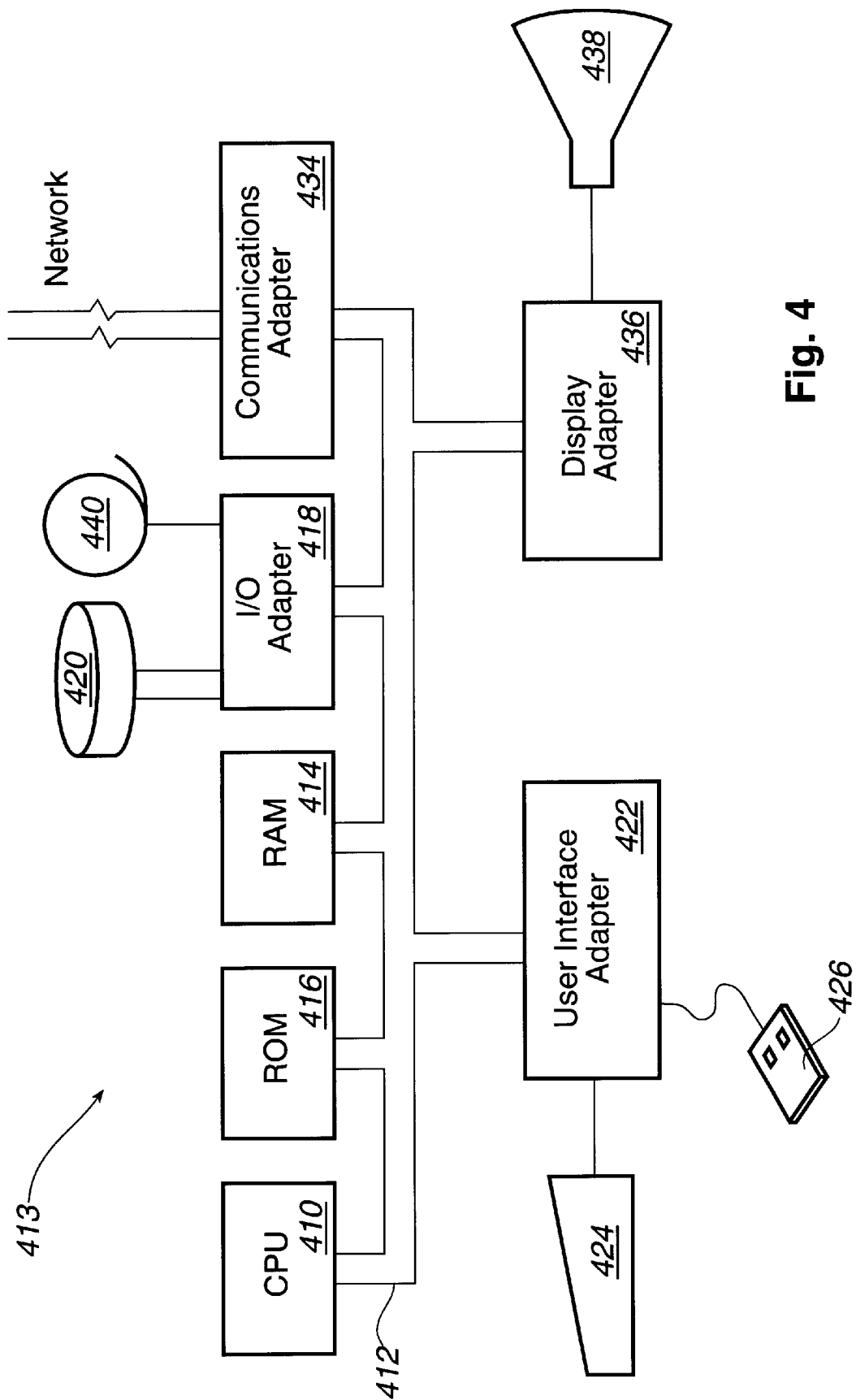
FIG. 4 illustrates a data processing system incorporating an embodiment of the present invention.

Referring first to FIG. 4, an example is shown of a data processing system 413 which may be used for the invention. The system 413 has a central processing unit (CPU) 410. The CPU 410 is coupled to various other components by system bus 412. Read only memory ("ROM") 416 is coupled to the system bus 412 and includes a basic input/output system ("BIOS") that controls certain basic functions of the data processing system 413. Random access memory ("RAM") 414, I/O adapter 418, and communications adapter 434 are also coupled to the system bus 412. I/O adapter 418 may be a small computer system interface ("SCSI") adapter that communicates with a disk storage device 420. Communications adapter 434 interconnects bus 412 with an outside network enabling the data processing system to communication with other such systems. Input/Output devices are also connected to system bus 412 via user interface adapter 422 and display adapter 436. Keyboard 424 and mouse 426 are interconnected to bus 412 via user interface adapter 422. Display monitor 438 is connected to system bus 412 by display adapter 436.

Preferred implementations of the invention include implementations as a computer system programmed to execute the method or methods described herein, and as a computer program product. According to the computer system implementation, sets of instructions for executing the method or methods are resident in the random access memory 414 of one or more computer systems configured generally as described above. Until required by the computer system, the set of instructions may be stored as a computer program product in another computer memory, for example, in disk drive 420 (which may include a removable memory such as an optical disk or floppy disk for eventual use in the disk drive 420). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 6:
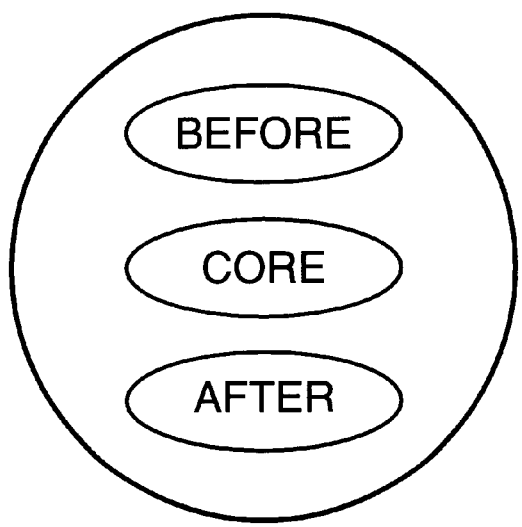
FIG. 6 illustrates the core, BEFORE, and AFTER classes within a class.

A solution to the foregoing problems would be to define a class initialization routine. The initialization of a class consists of defining the values of a set of class variables. Referring to FIG. 6, each class initialization routine would have three sections. The obvious section is the core initialization code, which initializes the static fields for this class. Two other sections are defined, the BEFORE section and the AFTER section. Since the execution of the core initialization oft he class may use some methods, the classes that provide these methods must be initialized before the core initialization of this class. The BEFORE section is a list of calls to the class initialization methods for all classes which are needed for the core initialization code. That is, all of the classes which must be initialized before this particular class. The super classes of this class are initialized as part of the BEFORE section. The AFTER section consists of calls to all class initialization methods for classes that are used by this class, in any of its methods, which are not initialized in the BEFORE section (i.e., do not have to be initialized before the core initialization).

The system as a whole is then initialized by calling the class initialization of the main class (the class with the main method which is executed). That main class initialization will initialize its super class, any classes that are needed by its core initialization code, then its own core, and then any other methods that it uses. Since each of these class initialization methods recursively call any other class initialization methods that are needed, the processes "floods" the classes, initializing all reachable classes before going on to actually execute the program.

To avoid initializing any class more than once, for each class, a static Boolean variable is defined, initially false, which indicates if initialization is already either complete or in progress. Each class initialized checks this flag upon entry, returning it if it is set, and if it was not set, immediately setting it as it begins its own initialization.

This solution is prone to failure, because there are cases where really important classes need another important class to be initialized first. But the second important class must initialize both its important classes (those in its BEFORE section) and its not so important classes (those in its AFTER section), before returning. The not-so-important classes must be initialized since there may be no other class which uses them and so no other class which will initialize them. However, while they need to be initialized, significant errors will occur if they are initialized before the important classes.

The present invention passes an "importance level" parameter to each class initialization method performed within each class object. The importance level is either 1 (important) or 2 (not important). A class initialization method initializes its BEFORE section at level 1 (important). If it was then called at level 1 only, it then returns without initializing its AFTER section. When it is later called at level 2, the class initialization method first initializes its BEFORE section at level 2, and then its AFTER section at level 2. This allows the process to first initialize all important classes (where the definition of what is important is determined locally by the class and the situation), but still be sure that all reachable classes are initialized eventually, before beginning operation of the main method.

Combining this with the earlier variable to prevent multiple initialization, the following pseudocode is created:

```
void class_initialization (level)
{
    static integer initlevel=0/*no initialization*/;
    while (initlevel < level)/*initialize at level 1 then 2 as needed*/
    {
        initlevel += 1;/*initialize at the next level*/
        ... initialize "before" section at level initlevel ...
        if(initlevel == 1)
            ... core class initialization ...
        else
            ... initialize "after" section at level initlevel (which is 2) ...
    }
}
```

The system is initialized by calling the class initialization method for the main method at level 2 before calling the main method. The class initialization methods then recursively call each other as necessary, initializing themselves (and those that they depend upon) first at level 1 and then at level 2, which results in a 2-stage flooding algorithm, until everything is initialized, important things first, as necessary.

For each class, there are a set of core variables that need to be initialized before the class may be used within the program. However, there are also a set of BEFORE variables that need to be initialized through calls to other classes. These BEFORE variables need to be initialized before the core variables. Additionally, there may be a set of AFTER classes, which do not need to be initialized before the core variables, but do need to be initialized before main execution of the program can begin. These AFTER classes provide methods or variables that are used by methods defined in the current class. Thus, the current class must make sure that the AFTER classes are initialized, but they can be intialized after the core variables.

Figure 5:
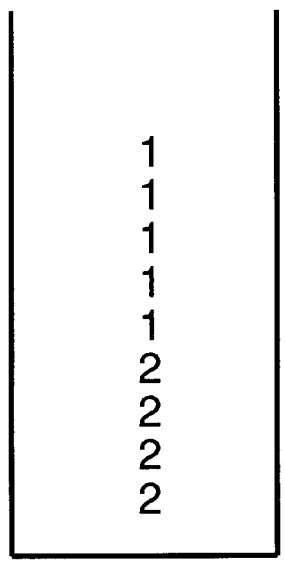
FIG. 5 illustrates how the present invention stacks the execution of the class initializations.

The present invention uses a two-phase approach. If a class is called at a level 1, then it will proceed to initialize its BEFORE section and core section, but will defer initialization of the AFTER section until a later time. An example of how the present invention implements this two-phase approach is illustrated in FIG. 5, which depicts an example of the execution stack for performing the initialization routines. The level 1 initialization routines are performed before the level 2 initialization routines, and this separation within the execution stack is maintained as the algorithm proceeds through its recursive process.

As described above, the classes implement a flag indicating if the initialization program within that class is in process. This flag is used to ensure that the initialization process for initializing the core variables within a class is not started more than once by a call to that process from another class. Therefore, as soon as an initialization routine is begun within a class, the flag is set indicating that that class is in the process of initializing its core variables. If a call is later made to that same process within that class, the process will return the initialization algorithm of the present invention back to the calling class.

Figure 3:
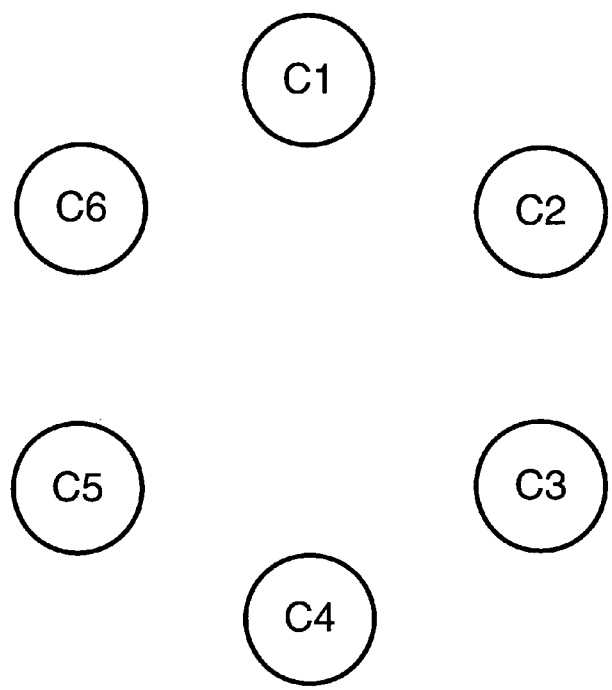
FIG. 3 illustrates six classes described with respect to an example implementation of the present invention.

Referring to the flow diagram in FIG. 3, it will be assumed that the initial initlevel will be equal to 0 for each class. In this present example, it will be assumed that class C4 contains the main method to be run. The classes and their BEFORE and AFTER classes are as listed in the following table.

| Classes | BEFORE | AFTER |
|---------|--------|-------|
| C1 | — | C2, C3 |
| C2 | C1 | C3 |
| C3 | C1 | C2, C6 |
| C4 | C1, C3 | C5 |
| C5 | C1, C2 | C4 |
| C6 | C1, C2, C4 | — |

With a normal flooding algorithm as discussed above, starting with class C4, the initialization will be in the following order: C1, C2, C3, C6, C4, C5, which violates the need to have C4 initialized before C6. As will be seen in the following example, the two-phase flooding algorithm of the present invention will initialize the classes in the following order: C1, C3, C4, C2, C6, C5.

Figure 2:
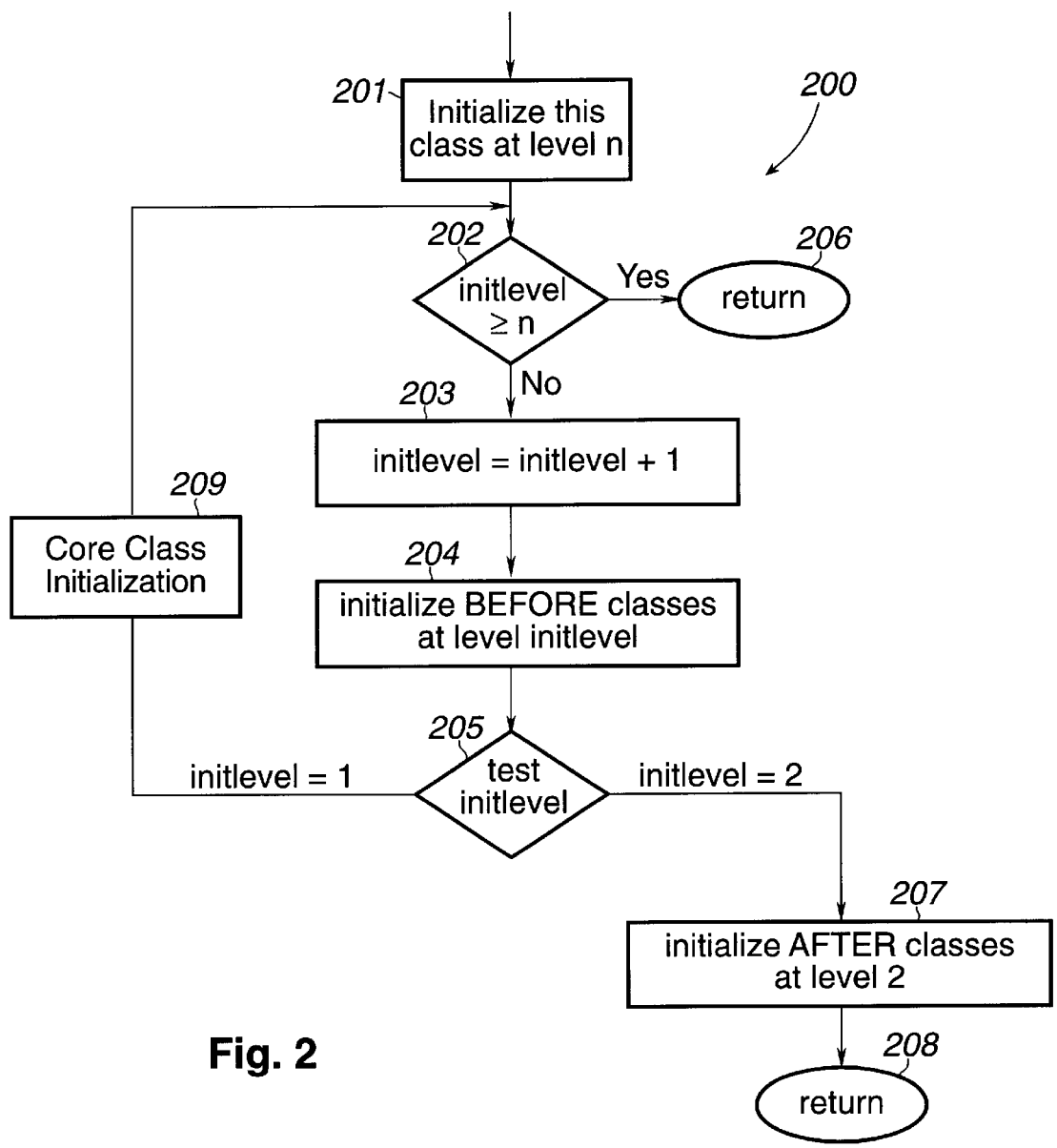
FIG. 2 illustrates the two-phase flooding algorithm for initializing variables within a class in accordance with the present invention.

Beginning with class C4 and proceeding to the flow diagram illustrated in FIG. 2, the initlevel for C4 will be equal to 0, and in accordance with the present invention, the process will begin the initialization of C4 at a level of 2. In step 202, it will be determined that the initlevel of zero is not greater than or equal to 2. Therefore, the next step is step 203 when the initlevel will be incremented by one so that the initlevel is now equal to 1. In step 204, a call will be made to the BEFORE classes for class C4 to initialize these BEFORE classes. The BEFORE classes for class C4 are classes C1 and C3. First, a call will be made to class C1 to initialize C1 at level initlevel, which is presently equal to 1 in C4. The process now proceeds to class C1 to perform the flow diagram of FIG. 2 with respect to class C1 to initialize it at a level (n) of initlevel, which is equal to 1. The process is now performing method 200 within class C1. At step 202, a determination is made that the initlevel of 0 for class C1 is not greater than or equal to the predesignated level of 1 as set within steps 203 and 204 previously performed within class C4. The process proceeds to step 203 to increment the initlevel for class C1 to a value of 1. In step 204, the BEFORE classes listed for class C1 are to be initialized. Since class C1 has no BEFORE classes, the process will proceed to step 205 to test the value of initlevel. Since initlevel for C1 is equal to 1, the process proceeds to step 209 to initialize the core variable in C1 (C1 has now been initialized). The core variables in C1 can now be initialized since all of the needed BEFORE classes (in the case of C1-none) have been initialized. The process returns to step 202 and determines that 1 is equal to 1. This causes the process to proceed to step 206 to return the algorithm to class C4. Therefore, the algorithm returns to step 204 for class C4 to now initialize the next BEFORE class for class C4, which is class C3. Now a call to perform process 200 within class C3 is performed, with a level (n) equal to the C4 initlevel of 1.

Class C3 begins running process 200 to initialize class C3 at the level 1 as designated within step 204 in class C4. The process proceeds to step 202 to determine that the initial initlevel of 0 for class C3 is not greater than or equal to n, equal to 1 causing the process to proceed to step 203 to increment the initlevel for C3 to be equal to 1. The process proceeds to step 204 to perform calls to initialize the BEFORE classes designated in the above table for class C3. The first call will be to class C1 to initialize class C1 at a level of 1.

Class C1 will now again perform the process within step 200 beginning at step 201. At step 202, it will be determined that the initlevel for class C1, equal to 1, is equal to the level n designated as being equal to 1 previously within class C3. This will cause the process to proceed to step 206 to return to step 204 within class C3. Process 200 is now resumed within class C3, and proceeds to step 205 to test the initlevel. Since the initlevel is equal to 1, the process initializes the core variables in C3. C3 is now initialized since its BEFORE classes have been initialized. The process returns to step 202 to determine if the initlevel is greater than or equal to n. Since these two values within C3 are equal, the process proceeds to step 206 to now return to step 204 within C4.

Since C4 has now initialized all of its BEFORE classes, process 200 within C4 will proceed to step 205. Since the initlevel within C4 is equal to 1, the process will proceed to step 209 to initialize the core variables in C4. The process will return to step 202. Recall that the initlevel within C4 is equal to 1, but C4 had its initialization start in step 201 with a level equal to 2. Since 1 is not greater than or equal to 2, the process within C4 proceeds to step 203 to increment C4's initlevel to a value of 2.

The process will now perform step 204, which will perform initialization calls again to the BEFORE classes listed for class C4, but now with a level equal to C4's initlevel, which is now equal to 2.

The first BEFORE class listed for class C4 is class C1. Within class C1, at step 201, the initialization process will begin for class C1 with a level equal to 2. Since class C1's initlevel is equal to 1, and since 1 is not greater than or equal to 2, process 200 within class C1 will proceed to step 203 to increment C1's initlevel to a value of 2. In step 204, the BEFORE classes listed for class C1 will be initialized. Since there are no such BEFORE classes, the process will proceed to step 205. Since the initlevel for class C1 is equal to 2, the process will proceed to step 207 to initialize the AFTER classes listed for class C1, which in this example are classes C2 and C3.

The first call will be made to class C2 with a designated level equal to 2. Process 200 within class C2 will now be performed. At step 202, since the initlevel for class C2 has been initialized to 0, and since 0 is less than 2, the process will proceed to step 203 to increment C2's initlevel to a value of 1. In step 204, initialization calls will be made to the BEFORE classes listed for class C2, which in this case is class C1. Therefore, a call will be made to perform process 200 within class C1 with a level equal to 1. In step 202, since C1's initlevel is equal to 2, and since 2 is greater than or equal to 1, which is the now designated level for class C1, the process will proceed to step 206 to return to step 204 within class C2. Since there are no more BEFORE classes within class C2, the process will proceed to step 205. Since the initlevel for class C2 is equal to 1, the core variables in C2 will be initialized now that all of C2's BEFORE classes have been initialized. The process then proceeds to step 202. Since the initlevel of 1 is still less than the level designated for C2 of 2, the process proceeds to increment the initlevel for C2 to a value of 2.

In step 204, the BEFORE classes listed for class C2, which in this case is only class C1, will be called to perform an initialization with a level equal to 2, which is C2's current initlevel. The process will then return to class C1 to perform process 200 with a level now equal to 2. In step 202, since the initlevel of C1 is equal to 2, and since the level n is equal to 2, the process will proceed to step 206 to return to step 204 within class C2. In step 205, since the initlevel for class C2 is equal to 2, the process will proceed to step 207 to perform initialization for the AFTER classes listed for class C2, which in this case is class C3, with a level equal to 2.

Process 200 within class C3 now begins at step 201 with a level equal to 2 in step 202, since the initlevel of 1 is less than or equal to the level n equal to 2 within C3, the process proceeds to step 203 to increment C3's initlevel to a value of 2. In step 204, the BEFORE classes listed for class C3 will now be initialized with a level equal to the initlevel of C3, which is now 2. The BEFORE class listed in class C3 is class C1. A call is then made to perform process 200 within class C1 with a level of 2. Since 2 is equal to 2, process 200 within C1 will proceed from step 202 to step 206 to then perform a return to step 204 within class C3. At step 205, since the initlevel for C3 is equal to 2, the process will proceed to step 207 to perform the initialization for the AFTER classes listed for class C3, which in this example are classes C2 and C6.

A call will be made to initialize class C2 at a level of 2. Process 200 will again be performed within C2. At step 202, since the initlevel for C2 is equal to 2, and the level n is equal to 2, the process will proceed to step 206 to return to step 207 being performed within C3. A call will then be made to C6 from step 207 in C3 with a level equal to 2. Process 200 will now be performed within C6. The initlevel for C6 has been initialized to 0. Since 0 is not greater than or equal to 2, the process will proceed to step 203 to increment the initlevel to a value of 1. Then, in step 204, the BEFORE classes listed for C6 will be initialized with a level equal to C6's initlevel of a value of one. The BEFORE classes listed for C6 are C1, C2, and C4.

Therefore, first a call will be made to C1 with a level equal to 1. At step 202 within C1, since the initlevel for C1 of 2 is greater than the level n with a value of 1, the process will proceed to step 206 to return to step 204 within C6. A call will then be made to C2 with a level of 1. Therefore, process 200 will be operated within C2. In step 202, since the initlevel for C2 is equal to 2, and since 2 is greater than or equal to the level set by step 204 within C6 of value 1, the process will proceed to step 206 to return to step 204 within C6. A call will then be made to C4 to perform process 200 with an initialized level of 1 (step 201). In step 202, since the initlevel for C4 is equal to 2, the process will proceed to step 206 to return to step 204 within C6. Since there are no more BEFORE classes listed for C6, the process will proceed to step 205. Since the initlevel for C6 is equal to 1, the process will proceed to step 209 to initialize the core variables within C6. This can be accomplished, since all of the BEFORE classes (established by methods within C1, C2, and C4 have been initialized. C6 is now initialized. The process will then return to step 202. Since the initlevel for C6 is equal to 1, and the level n for C6 is equal to 2, the process will proceed to step 203 to increment the initlevel to a value of 2. Then, at step 204, the BEFORE classes for C6 will be initialized with a level of 2. Since each of classes C1, C2, and C4 have already been initialized, calls to these classes to perform process 200 will result in steps 201, 202, and 206 being performed with respect to each of these classes, resulting with each of them returning to C6. Then, in step 205, since the initlevel for C6 is equal to 2, the process will proceed to step 207 to initialize the AFTER classes within C6 with a level 2. Since there are no AFTER classes pertaining to C6, the process will proceed to step 208 to return to step 207 within process 200 operating in class C3. In C3, since there are no more AFTER classes, the process will proceed to step 208 to then return to step 207 being performed within process 200 in class C2. Since there are no more AFTER classes pertaining to C2, the process will proceed to step 208 to then return to step 207 in process 200 running within class C1. The next AFTER class in C1 is C3. Therefore, process 200 will begin within C3 with an initialize level of 2. In step 202, since the initlevel 2 is equal to n, which is 2, the process will proceed to step 206 to return to step 207 within C1. The process within C1 will then proceed to step 208 to return to step 204 in C4. Since there are no more BEFORE classes within C4, the process will proceed to step 205. Since the initlevel for C4 is equal to 2, the process will proceed to step 207 to initialize the AFTER classes pertaining to C4 with a level of 2. The AFTER class for C4 is C5. Process 200 will now be performed within C5 with a level of 2. Since the initlevel is less than the level of 2, the process will proceed from step 202 to step 203 to increment the initlevel for C5 to a value of 1. Next, in step 204, the BEFORE classes (classes C1 and C2) in C5 will be initialized with a level of 1. Since the initlevels for classes C1 and C2 are both 2, in steps 202 performed within these classes, the process will proceed to steps 206, returning both of these processes to step 204 performing in process 200 running C5. Next, in step 205, since the initlevel is equal to 1 in C5, the process will proceed to step 209 to initialize the core variables within C5, thus initializing the last of the classes. The process will return to step 202. Since the initlevel for C5 is still less than its value for N, the process will increment the initlevel to a value of 2 in step 203. The process then proceeds to step 204 to initialize the BEFORE classes pertaining to class C5 with a level of 2. Again, since classes C1 and C2 have already been initialized, their initlevels will be equal to 2 causing their processes to proceed from steps 202 to steps 206 to return them to step 204 within C5. Process 200 within C5 will then proceed to step 205. Since the initlevel for C5 is now equal to 2, the process will proceed to step 207 to initialize the AFTER classes for C5. The only AFTER class designated for C5 is Class C4. Process 200 will then be called within Class C4 with an initial level equal to 2. Again, since the initlevel for C4 is already equal to 2, process 200 within C4 will proceed from steps 201 and 202 to 206 returning the process to step 207 within C5. The process within C5 will then proceed to step 208 to then return to step 207 within C4. The process in C4 will then proceed to step 208. At this point, all class initialization is complete, and computation in the main program can continue.

The above example shows how process 200 performed within each of the classes initializes the variables within the classes in the proper order. Specifically, in this example, the core variables in C4 are initialized before the core variables in C6.

Although the present invention and its advantages have been described in detail, it should be understood that various changes, substitutions and alterations can be made herein without departing from the spirit and scope of the invention as defined by the appended claims.

What is claimed is:

1. A method for initializing variables in a first class object in an object-oriented program, comprising the steps of:
   sending a message from the first class object to a second class object that it initialize its core variables, wherein the core variables of the second class object need to be initialized before core variables in the first class object are initialized; and
   initializing the core variables in the first class object when the core variables in the second class object have been initialized.

2. The method as recited in claim 1, wherein the sending step further comprises the step of sending the message from the first class object to all class objects having core variables that need to be initialized before the core variables in the first class object are initialized.

3. The method as recited in claim 2, further comprising the step of:
   sending the message from the first class object to those class objects having core variables that do not need to be initialized before the core variables in the first class object are initialized.

4. The method as recited in claim 2, wherein the object-oriented program is created with a statically loaded object-oriented programming language.

5. The method as recited in claim 1, further comprising the steps of:
   sending a message from the second class object to a third class object that it initialize its core variables, wherein the core variables of the third class object need to be initialized before core variables in the second class object are initialized; and
   initializing the core variables in the second class object when the core variables in the third class object have been initialized.

6. The method as recited in claim 5, wherein the core variables in the second and third class objects are initialized before the core variables in the first class object are initialized.

7. A method for initializing variables in a plurality of class objects created in a statically loaded object-oriented programming language, comprising the steps of:
   within each of the class objects, sending messages to BEFORE class objects to initialize their core variables; and
   within each of the class objects, initializing the core variables after all of the BEFORE class objects have initialized their core variables.

8. The method as recited in claim 7, further comprising the step of:
   within each of the class objects, initializing AFTER class objects subsequent to initialization of its core variables.

9. The method as recited in claim 7, wherein after each of the BEFORE class objects has initialized its core variables, a return is made to the class object that sent the message.

10. A computer program product adaptable for storage on a computer readable medium, the computer program product operable for initializing variables in a plurality of class objects, the computer program product comprising:
    first and second class objects, the first class object operable for sending a message from the first class object to the second class object instructing the second class object to initialize its core variables, wherein the core variables of the second class object need to be initialized before core variables in the first class object are initialized, wherein the first class object is operable for initializing the core variables in the first class object when the core variables in the second class object have been initialized.

11. The computer program product as recited in claim 10, wherein the first class object sends the message from the first class object to all class objects having core variables that need to be initialized before the core variables in the first class object are initialized.

12. The computer program product as recited in claim 11, wherein the first class object is operable for sending another message from the first class object to those class objects having core variables that do not need to be initialized before the core variables in the first class object are initialized, wherein the another message instructs the those class objects to initialize their core variables.

13. The computer program product as recited in claim 12, wherein the computer program product is an object-oriented program created with a statically loaded object-oriented programming language.

14. The computer program product as recited in claim 10, wherein the second class object is operable for sending a message from the second class object to a third class object instructing the third class object to initialize its core variables, wherein the core variables of the third class object need to be initialized before core variables in the second class object are initialized.

15. The computer program product as recited in claim 14, wherein the second class object is operable for initializing the core variables in the second class object when the core variables in the third class object have been initialized.

16. A method for initializing variables in class objects in a statically created object-oriented programming language, comprising the steps of:

a) predetermining a first class object to have an importance level of two and a flag of zero;

b) comparing the importance level and the flag;

c) if the flag is less than the importance level, incrementing the flag;

d) sending a message to a second class object instructing the second class object to initialize its core variables with an importance level set to be equal to the incremented flag and return to the first class object;

e) testing a value of the flag;

f) if the flag is equal to one, initializing core variables of the first class object;

g) repeating steps b) through e);

h) if the flag is equal to two, sending a message to a third class object instructing the third class object to initialize its core variables with an importance level set to be equal to the incremented flag and return to the first class object.

17. The method as recited in claim 16, wherein the second and third class objects perform steps b) through h) upon receiving their respective messages.

* * * * *